July 18, 1967 J. T. NEISWINTER ETAL 3,331,921

OPEN CIRCUIT DISCONNECTOR AND ANNOUNCER

Filed Oct. 24, 1963 2 Sheets-Sheet 1

INVENTORS
JAMES T. NEISWINTER
CARL N. PEDERSON
BY Haggren, Wegner, Allen, Stellman & McCord
Attys.

3,331,921

OPEN CIRCUIT DISCONNECTOR AND ANNOUNCER

James T. Neiswinter, Garden City, N.Y., and Carl N. Pederson, Westmont, Ill., assignors to Pioneer Electric and Research Corporation, a corporation of Illinois Filed Oct. 24, 1963, Ser. No. 318,672
3 Claims. (Cl. 178—69)

ABSTRACT OF THE DISCLOSURE

In a teletype network comprising a plurality of interconnected receiving and sending hubs with their respective associated legs, the mechanism detects an open circuit on a receive leg and disconnects its associated receive hub from the sending hub, thereby localizing the effects of the open circuit. An alarm is generated at the telegraph office associated with the disconnected hub. A special code signal may then be transmitted to the associated send hub, in forming the remainder of the telegraph network of the open condition and that it is being attended to.

Figure 1:
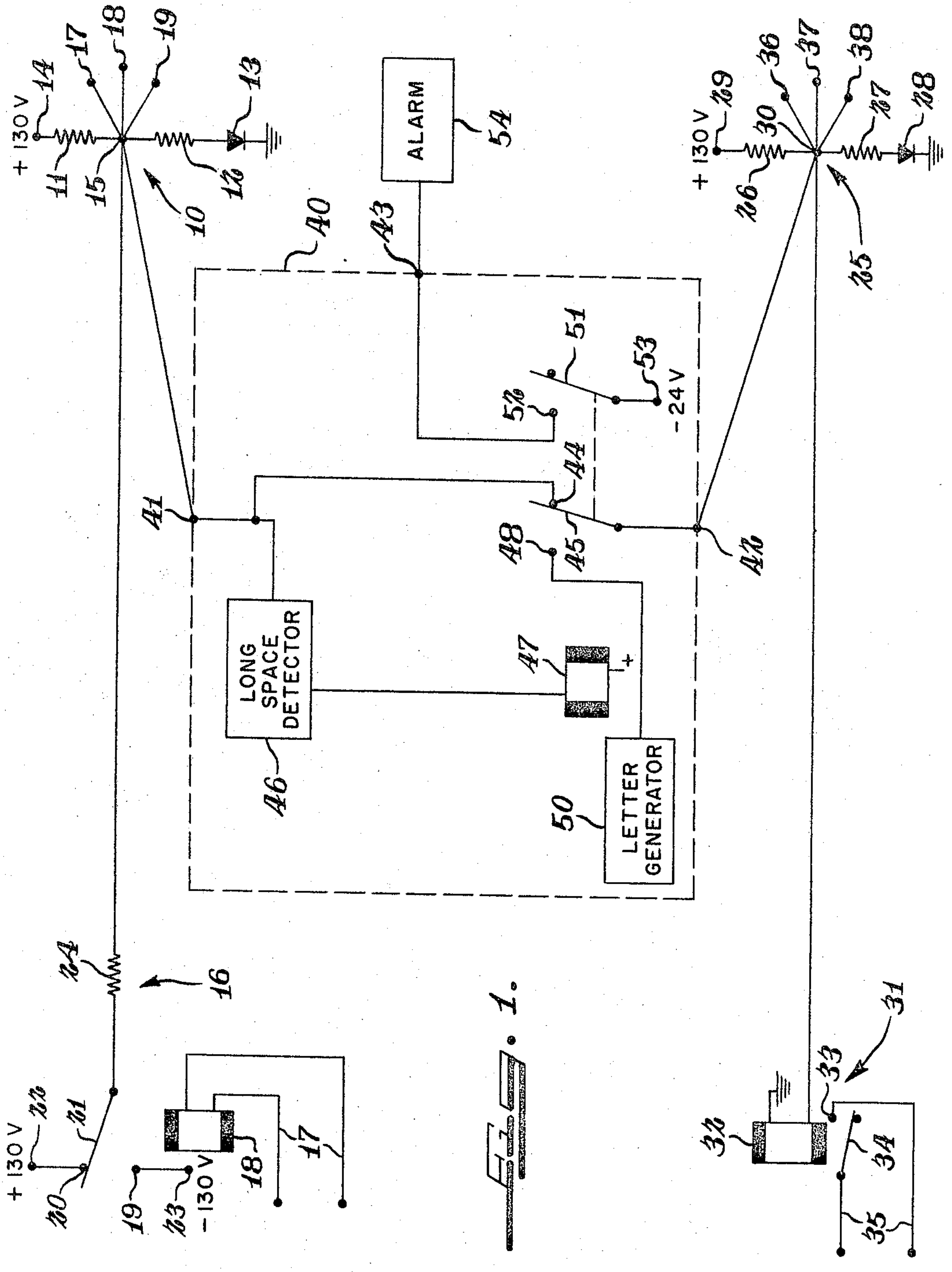

The present invention relates to a telegraph receive and send hub disconnect device and more particularly, to a device for disconnecting a telegraph receive hub from a telegraph send hub when an open circuit occurs on a telegraph receive leg connected to the receive hub.

In telegraph circuits, a receive hub is normally connected to a send hub by either a direct connection or through a regenerative repeater connected between the receive and send hubs.

When the receive leg of a telegraph leg becomes "open," a receive hub to which the respective receive leg is connected, will commence to "space." The receive hub is connected either directly to its corresponding send hub or through a regenerative repeater which receives signals from the receive hub and transmits corresponding signals of greater amplitude to the corresponding send hub. The "open" or "spacing" condition will spread throughout the telegraph network via the associated send hub and the send legs connected thereto. On a press circuit, for example, on which there may be several hundred teletypewriters operating continuously, an "open" condition will cause hundreds of teletypewriters to run "open." Many of the customers whose teletypewriters are running "open" will report the condition to their respective test boards. Each test board receiving such a report will first check the direction from which the "open" is received and then will report the condition to the adjacent test board. Thus, the result of an "open" condition is the creating of many customer reports and the generating of action by many test boards to trace the "open" condition back to the responsible office. Therefore, the single "open" condition on a busy or crowded circuit will cause the expenditure of many man-hours of effort, both on the part of customers and on the part of telephone company personnel. The present invention solves the problem of unnecessary customer reporting and test board searching in regard to an "open" condition. The present invention provides a device to be connected between a receive hub and a send hub directly, or if a regenerative repeater is used between the hubs, in series with the regenerative repeater, which actuates an alarm at the office at which the "open" receive leg terminates, opens the connection between the receive hub and its associated send hub so that the "open" does not appear throughout the telegraph system, and if desired, generates special signals and transmits them to the associated send hub so that the remainder of the telegraph system will be aware that an "open" condition has arisen but that it is being investigated and repaired by personnel from another part of the system. Thus, customers will know that the failure in the system is being rectified and each telegraph office, other than the one directly concerned, will know that they do not have to take corrective action on the failure. Thus, only the labor that is actually required to repair the "open" is expended.

Therefore, it is an object of the present invention to provide a new and improved telegraph circuit.

Another object is to provide a device which can be inserted between a receive hub and its associated send hub or in series with a regenerative repeater connected therebetween which will detect an "open" condition occurring on any one of the receive legs connected to the receive hub.

An additional object is to provide a device which will actuate an alarm at the telegraph office at which a receive leg terminates when the receive leg becomes "open."

A further object is to provide a telegraph device which will disconnect a receive hub from a send hub whenever a receive leg connected to the receive hub becomes "open."

Still another object is to provide a device which will generate predetermined signals and transmit them over a telegraph network through a send hub when an associated receive hub has one of the legs connected thereto in an "open" condition.

Yet another object of the present invention is to detect "spacing" on a receive hub for a time period greater than a predetermined period and to actuate an alarm, disconnect the receive hub from a send hub, and generate predetermined signals over the send hub whenever spacing beyond the predetermined period occurs on the receive hub.

Figure 2:
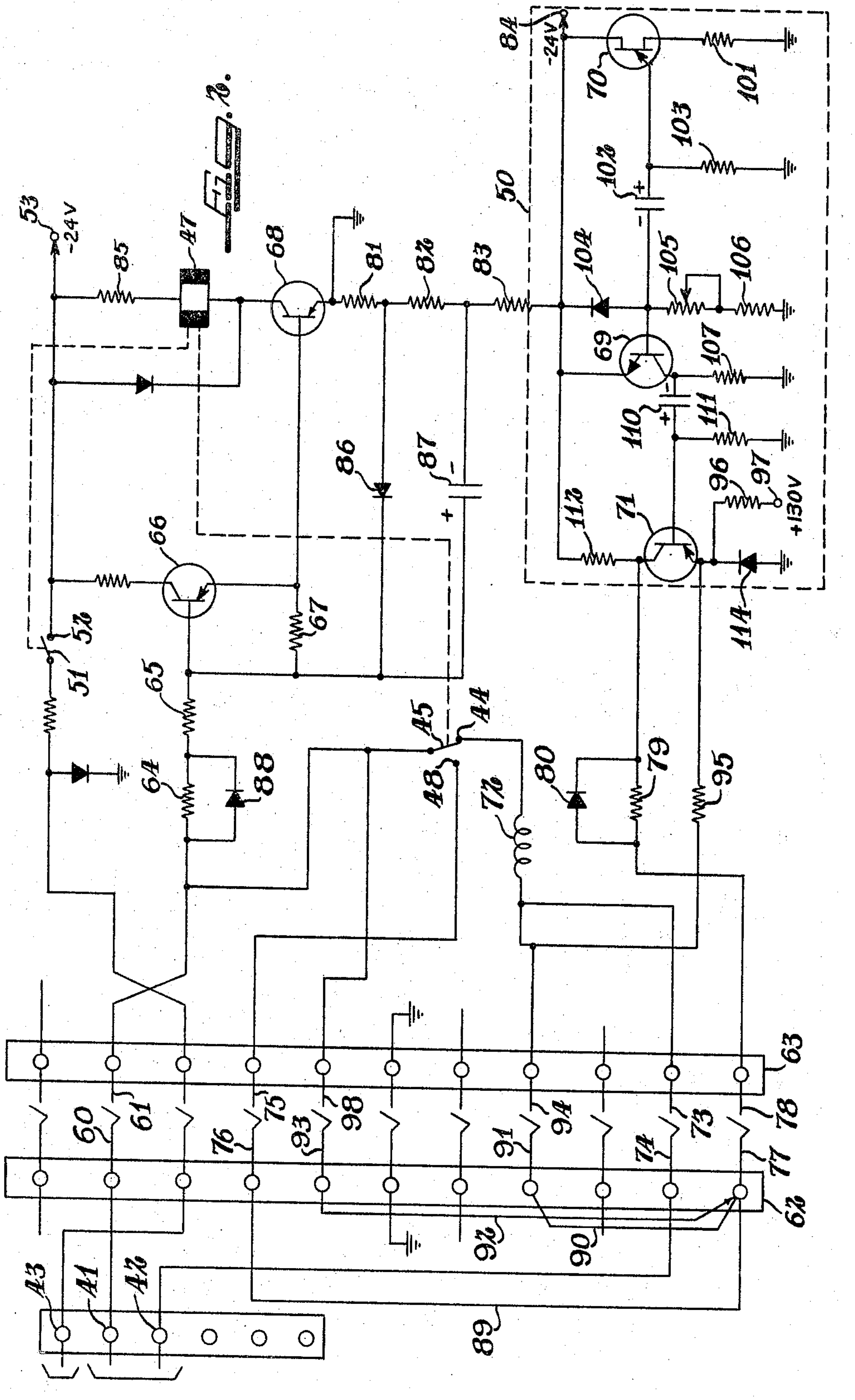

Further objects and advantages will become apparent from the following detailed description taken in connection with the accompanying drawings, in which:

FIGURE 1 is a diagram of an embodiment of the present invention inserted into a telegraph circuit, and FIGURE 2 is a detailed schematic diagram of the embodiment of the invention shown in FIGURE 1.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Referring now to FIGURE 1, a telegraph receive hub, generally indicated at 10, consists of a 5,000 ohm resistor 11, a 4,000 ohm resistor 12, and a rectifier 13, connected between a terminal 14 and ground. Terminal 14 is connected to a positive 130 volt D.C. source (not shown). At the juncture of the resistors 11 and 12, a terminal 15 is provided through which a receive leg, generally indicated at 16, is connected. The receive leg 16 consists of lines 17, which terminate in a relay having a coil 18, fixed contacts 19 and 20, and a movable contact 21. The fixed contact 20 is connected to a positive 130 volt direct current source, and the fixed contact 19 is connected to a terminal 23, which is connected to a negative 130 volt direct current source (not shown). The movable contact 21 is connected to terminal 15 through a 3,000 ohm resistor 24. A plurality of other receive legs are connected to the terminal 15 and are represented in FIGURE 1 by lines 17, 18 and 19. These receive legs are identical in structure to receive leg 16.

A send hub, generally indicated at 25, consists of a 5,000 ohm resistor 26, a 4,000 ohm resistor 27, and a rectifier 28, serially connected between a terminal 29, which is connected to a positive 130 volt direct current source (not shown) and ground. A terminal 30 at the junction of resistors 26 and 27 is connected to a send leg, generally indicated at 31, which includes a relay having a relay coil 32 connected between the terminal 30 and ground, a fixed contact 33, and a movable contact 34. The contacts 33 and 34 are serially connected in send lines 35. A plurality of send legs identical to send leg 31 are connected to the terminal 30 and are symbolically illustrated in FIGURE 1 by lines 36, 37 and 38. A telegraph device, hereinafter referred to as an "open circuit announcer," is enclosed by dashed line 40 and has terminals 41, 42 and 43. Terminal 41 is connected to terminal 15 of the receive hub 10, while terminal 42 is connected to the terminal 30 of the send hub 25. The terminal 41 is normally connected to terminal 42 via a fixed relay contact 44 and a movable cooperating contact 45 which are normally closed. A long space detector 46 is connected to terminal 41 and to a relay coil 47 in order to detect continuous spacing on terminal 15 of a period greater than a predetermined period of time and to energize relay 47 when the spacing on terminal 15 has exceeded the predetermined period. The energization of coil 47 opens the contacts 44 and 45 so that terminal 41 is no longer connected to terminal 42. When the coil 47 is energized, the movable contact 45 closes on a fixed contact 48, which is connected to a letter generator 50. Energization of the coil 47 also closes a movable contact 51 with a fixed contact 52. Movable contact 51 is connected to a terminal 53 which, in turn, is connected to a negative 24 volt direct current source (not shown). The fixed contact 52 is connected to contact 43 which is, in turn, connected to an alarm 54.

When there are no signals being transferred by the receive telegraph leg 16, the terminating relay coil 18 is de-energized and the movable contact 21 is connected to a positive 130 volt direct current source. Assuming that no message is being transmitted on leg 16, and therefore, +130 volts is being applied to resistor 24, the resistor 24 drops positive 130 volt voltage to a positive 60 volts. When the legs 16–19 are all "marking," the voltage at terminal 15 is a positive 60 volts. As soon as the first "mark" of a signal is placed upon line 17, relay coil 18 is energized and the movable contact 21 is disconnected from the positive 130 volts D.C. and connected to a negative 130 volts D.C., causing the voltage at terminal 15 to drop to a negative 30 volts. If an "open" circuit condition occurred in leg 16, the terminal 15 would drop to a negative 30 volts and without the insertion of the open circuit announcer 40 between the receive hub 10 and the send hub 25, the continual "spacing" on hub 10 would be transferred to send hub 25 and thereby cause all send legs 31, 36, 37 and 38, originating at the send hub, to "space" continuously. However, if the open circuit announcer 40 is interposed between the receive hub 10 and the send hub 25, as illustrated in FIGURE 1, the long space detector 46 will detect a continuous "spacing" on hub 10 at terminal 15 for a period which exceeds a predetermined period of time, preferably three seconds or more, and will, at the end of the predetermined period of time, energize relay coil 47 to open contacts 44 and 45 and to close contact 45 against contact 48. This action disconnects terminal 41 from 42, thereby isolating the send hub 25 from receive hub 10 so that the open condition is no longer transmitted throughout the remainder of the telegraph system via send hub 25. The letter generator 50, being now connected to the terminal 30 of hub 25, transmits to the send hub a letter code character which is preferably V, M or the "Letter" character. The particular character generated by the letter generator 50 may be selected by an appropriate adjustment on the generator. The letter produced is repeated at about half the normal sending speed. It is, therefore, distinct from a normal repeated character such as might occur if a tape were stuck. The repeated character will go out on all send legs connected to the send hub 25 except the one associated with the receive leg on which the "open" condition is being received. The repeated characters arriving on the various teletypewriters indicate to the respective customers that the circuit is temporarily unusable, but that the telegraph company is aware of the trouble and the customer need not report the condition to a telegraph office.

Actuation of relay 47 by the long space detector 46 also closes the contacts 51 and 52 so that a negative 24 volts is supplied to alarm 54 to terminal 43. The alarm 54 is situated in the office which is expected to investigate and repair the "open" receive leg. The alarm 54 may be composed of any combination of visual or audio alarm devices. Thus, when the open circuit announcer 40 is utilized, only the office affected receives an alarm, and the other offices on the circuit receive no alarm and thus, do not come in on the circuit. As soon as the office concerned clears the trouble, service is restored on the circuit with only two offices at the most being involved, assuming it was necessary to call in a second office to complete a patch on the circuit.

Referring now to FIGURE 2, the circuit of the open circuit announcer 40 will be described in greater detail. The terminal 41, connected to the terminal 15 of the receive hub 10, is connected through a pair of connector pins 60 and 61, a pair of cooperating connectors 62 and 63, through a 470,000 ohm resistor 64, and a 62,000 ohm resistor 65 to the base of a 2N404A transistor 66 and further through a 47,000 ohm resistor 67 to a base of another 2N404A transistor 68. The collector of transistor 68 is connected to the relay coil 47.

A 2N634A transistor 69 and a 2N1671 unijunction transistor 70 are included in the letter generator 50. They comprise a multivibrator circuit which operates continuously, a 2N398 transistor 71 which is a buffer and voltage shifter between the output of the multivibrator and the send hub 25 when it is connected thereto.

When the relay coil 47 is de-energized, terminal 41 is connected through pins 60 and 61, contacts 45 and 44, an inductance 72, a pair of cooperating pins 73 and 74 of connectors 62 and 63 to terminal 42 to complete the direct connection between the receive and send hubs. When the relay coil 47 is operated after a continuous three second or more space condition has existed on the receive hub, its contacts 44 and 45 open to disconnect the send hub from the receive hub and contacts 45 and 48 close to connect the send hub to the output of the multivibrator through a pair of pins 75 and 76, a resistor 79, a pair of cooperating pins 77 and 78, and a rectifier 80, connected in parallel with resistor 79 to the collector of transistor 71. The output signal of the multivibrator of the letter generator 50 is a repeated M, V or "Letters" character, the character being adjustable. When the receive hub returns to "marking," the relay 47 is de-energized and the send hub 25 is disconnected from the letter generator 50 and is connected back to the receive hub 10.

The emitter of transistor 68 is connected to a 470 ohm resistor 81, another 470 ohm resistor 82, and a 47,000 ohm resistor 83 to a terminal 84 which is connected to a negative 24 volt direct current source (not shown). The collector of transistor 68 is connected through the relay coil 47, a 220 ohm resistor 85 to the terminal 53 which is also connected to the negative 24 volt direct current source. An 18 volt zener diode 86 is connected to the junction of resistors 81 and 82 and to resistor 65 and a capacitor 85 is connected to the junction of resistors 82 and 83 and to resistor 65. When the receive hub is "marking," the positive 60 volts at terminal 15 is applied through a rectifier 88 connected in parallel with resistor 64 through resistor 65 and through the 18 volt zener diode 86 to produce a negative 2 volt electrical potential at the junction of resistors 81 and 82. This limits the voltage on the base of transistor 66 and transistor 68 to a positive 16 volts, which maintains these transistors in a non-conducting state. At this time, the voltage of the left-hand plate of condenser 75 is at a positive 16 volts, while the right-hand plate is at a negative 4 volts. When the receive hub starts to "space," the negative 30 volts of terminal 15 is applied through resistors 64 and 65 to the left-hand plate of condenser 87 and the bases of transistors 66 and 68. At this time, rectifier 88 can no longer conduct. In about three seconds, the voltage on the left plate of condenser 87 changes from the positive 16 volts to a negative 3 volts. When the voltage on the left plate of the condenser 87 approaches a negative three volts, transistor 66 will conduct because its emitter is connected through the base-emitter path of transistor 68 to ground. When transistor 66 conducts, the transistor 68 will conduct, energizing coil 47. When the receive hub returns to "marking," the positive 60 volts on the hub will be bypassed around resistor 64 by the rectifier 88 and capacitor 87 will be quickly recharged to a positive 16 volts on its left plate. As aforementioned, the energizing of relay coil 47 disconnects the send hub 25 from the receive hub 10 and connects it to the letter generator 50, whose multivibrator circuit is sending a repeated letter V, M or "Letters" character. In certain situations, it is desirable to hold the send hub 25 at a continuous "mark" or at a continuous "space" rather than transmitting a code character from the letter generator 50 to the send hub. If it is desired to hold a continuous "mark" on send hub 25 in the event of an "open" condition occurring on one of the receive legs 16–19, a connecting strap 89 which connects the connecting pins 76 and 77 of connector 62 is removed and a strap 90 is connected between pin 76 and a pin 91. If it should be desired to hold hub 25 in a continuous "space," a strap 92 is connected between pin 77 and a pin 93 on connector 62 in lieu of straps 89 or 90. When the cooperating connectors 62 and 63 are secured together, pin 82 is connected through a cooperating pin 94, 4,700 ohm resistor 95, and a 6,800 ohm resistor 96 to a terminal 97 which is connected to a positive 130 volt direct current source (not shown) in order that a positive 56 volts will be placed upon terminal 30 of the send hub when an "open" condition occurs on one of the receive legs 16–19. The positive 56 volts applied to the send hub under these conditions is sufficiently close to the normal "marking" voltage of a positive 60 volts to energize the send leg relay coils such as 32 of send leg 31 and thereby place a continuous "mark" on the send legs. The pin 93 cooperates with a pin 98 which is connected to pin 41 in order that, when the connectors 62 and 63 are joined to each other, the receive hub 10 will again be connected to the send hub 25 after relay 53 has been actuated so that the "space" occurring on receive hub 10 is continuously held on send hub 25.

Regardless of which of the three straps 89, 90 and 92 is utilized, the return of the receive hub to "marking" will de-energize relay coil 47 and restore the normal connection between the receive and send hubs for service.

The two terminals of unijunction transistor 70 are connected in series with an 1,800 ohm resistor 101 between the terminal 84 which is at a negative 24 volts D.C. and ground. The emitter of unijunction transistor 70 is connected through a 68 microfarad condenser 102 to the base of transistor 69 and to ground through a resistor 103. A rectifier 104 is connected between the base of transistor 69 and terminal 84, and a series resistance network, composed of a 5,000 ohm variable resistor 105 and a 910 ohm fixed resistor 106 is connected between the base and ground. The emitter of transistor 69 is connected to the terminal 84 and its collector is connected through a 10,000 ohm resistor 107 to ground and through a 4 microfarad condenser 110 to the base of transistor 71. The base of transistor 71 is connected through a 100,000 ohm resistor 111 to ground. Its collector is connected through an 8,200 ohm resistor 112 to terminal 84, and its emitter is connected through a rectifier 114 to ground and through resistor 96 to terminal 97. The section of the unijunction transistor 70 between its terminals acts as if it were a potentiometer of approximately 10,000 ohms overall resistance with a tap about the halfway point where the emitter is connected. With most of the negative 24 volts appearing across transistor 70, the voltage at the point where the emitter connects is at about −12 volts or about half the applied voltage across its terminals. If the voltage between the emitter and its upper terminal is less than half the overall applied voltage across the terminals of the transistor, the emitter connection to the transistor is open. If the voltage between the emitter and terminal 84 exceeds about half the value of the applied voltage, then the emitter section of the transistor breaks down to a very low resistance value and remains in this condition until the current flowing in this path becomes approximately 5 milliamperes. At this point, the emitter path again becomes an open circuit. Assuming that the voltage on the emitter is between −12 and −24 volts, the emitter circuit will be opened. Under this condition, the ground applied to resistor 103 will charge the right plate of capacitor 102 toward zero volts. When the voltage on the right plate of capacitor 102 reaches a negative 11 volts so that the voltage between the emitter and terminal 84 exceeds about half the overall applied voltage to the transistor, the emitter path breaks down and the voltage on the emitter and on the right plate of the capacitor charges from about −11 volts to about −21 volts. The drop across the emitter section of transistor 70 accounts for the remaining three volts between terminal 84 and ground. Before the breakdown occurs, the voltage on the base of transistor 69 and on the left plate of capacitor 102 is about −24 volts because of the conduction of the transistor 69 through its base-emitter path to terminal 84. When the negative 10 volt change occurs on the right plate of capacitor 102, a negative 10 volt change must also occur momentarily on the left plate. Thus, the voltage on the left plate of capacitor 102 changes from about −24 to about −34 volts. This voltage change renders transistor 69 non-conducting, leaving as the only circuitry connected to the left plate of capacitor 102, the rectifier 104 which is now back biased and the resistance network 105 and 106 which is connected to ground. Under this condition, the negative 34 volts on the left plate of capacitor 102 with the negative 21 volts on the right plate, the conducting unijunction transistor 70 and the two resistors 105 and 106 create a circuit with a current flow powered by the 13 volts on the capacitor. As this current flows, the charge and voltage on the capacitor decrease and the current flow through the unijunction transistor decreases. When the current flow falls below the sustaining current value of the unijunction, the unijunction cuts off and the emitter circuit becomes open again. The time interval for this action is controlled by the value of capacitor 102 and by the value of resistors 105 and 106.

Once the emitter of the unijunction transistor 70 goes non-conducting, the voltage on the right plate of capacitor 102 charges in a positive direction and the voltage on the left plate also charges in a positive direction. This causes transistor 69 to become conducting. With transistor 69 conducting, there is a charge path for capacitor 102 existing from ground through resistor 103, the capacitor 102 and the base-emitter path of transistor 69 to the negative 24 volts on terminal 84. Since all the voltage drop in this circuit occurs initially across resistor 103, the voltage at the emitter of the unijunction is also near −24 volts. As the charging action continues, the voltage on the right plate of capacitor 102 increases in a positive direction until, when it has charged from approximately a −24 volts to about −11 volts, the emitter section of the unijunction transistor breaks down again. The time for this action is determined by the values of capacitor 102 and resistor 103.

When the transistor 69 conducts, the voltage at its collector is approximately —24 volts, and when it is non-conducting, the voltage is approximately zero. The transistor 71 is normally conducting because its emitter is at a positive 56 volts supplied through terminal 97 which is near the positive 60 volts normally used for a "marking" hub voltage. When this transistor is non-conducting, the voltage at its collector is approximately —24 volts which is near the —30 volts normally utilized for a "spacing" hub voltage. Since the actual crossover voltage between +60 and —30 volts is +15 volts, the use of +56 volts for a "mark" voltage and —24 for a "space" voltage is satisfactory. With transistor 58 conducting, the voltage on left plate of condenser 110 is +56 volts. With transistor 69 conducting, the voltage at its collector is —24 volts. When transistor 69 becomes non-conducting because of the action of a multivibrator, the voltage on its collector changes from —24 volts to about zero or a positive 24 volt change. This same positive 24 volt change will occur on the left plate of capacitor 110 changing the voltage at this point from +56 to +70 volts. This causes transistor 58 to become non-conducting and the voltage on its collector to become a negative 24 volts which is the "spacing" condition.

When transistor 69 goes back to conducting, the voltage on its collector changes from ground to a negative 24 volts. This negative 24 volt charge causes transistor 71 to conduct and the marking voltage of +56 volts to appear on its collector. The function of capacitor 110 is that of a voltage shifter between zero and —24 volts at the collector of transistor 69 and the +56 volt and +70 volt levels utilized on the base of transistor 71. If the non-conducting condition of transistor 69, which made transistor 71 become non-conducting, persisted for a sufficiently long time, the charge current through capacitor 110 would disappear and transistor 71 would go back to conducting due to the ground applied to its base through resistor 111. However, the "space" portions of the characters M, V and "Letters" are so short when compared to the time constant of capacitor 110 and resistor 111 that this cannot occur. Therefore, capacitor 110 acts only as a voltage shifter.

The length of the "space" portion of the characters is determined by the adjustment of variable resistor 105. This permits obtaining either M, V or "Letters" as a repeated character. As aforementioned, with connecting strap 89 in place, the actuation of relay coil 47 connects the collector of transistor 71 to the send hub 25 so that the characters chosen by the positioning of variable resistor 105 are transmitted throughout the remainder of the telegraph system via send legs 31, 36, 37 and 38.

We claim:

1. A teletype control circuit for insertion between a receive hub and a send hub comprising:

means for alternatively connecting and disconnecting a send hub from a receive hub, a pair of terminals of which one is adapted to be connected to a send hub and the other is adapted to be connected to a receive hub, said connecting means being connected in series between said terminals, signal generator means for generating a teletype letter signal including:

a unijunction transistor having two terminals adapted to be connected across a direct current source and an emitter, a resistance connected between the emitter and one said terminals, a two-junction transistor having a base, a collector and an emitter, said collector and emitter adapted to be connected across a direct current source, a condenser connected between the emitter of said unijunction transistor and the base of said two-junction transistor, a variable resistance connected across said condenser through said one terminal and said emitter of said unijunction transistor, a rectifier connected between the base and the emitter of said two-junction transistor, and control means connected to said connecting means and to said receive hub terminal to cause said connecting means to disconnect a send hub from a receive hub and connect it to said emitter of two-junction transistor of said signal generating means when the control means detects spacing on the receive hub terminal for a preselected period of time.

2. A teletype control circuit for insertion between a receive hub and a send hub comprising:

means for alternatively connecting and disconnecting a send hub from a receive hub, a pair of terminals of which one is adapted to be connected to a send hub and the other is adapted to be connected to a receive hub, said connecting means being connected in series between said terminals, and signal generator means for generating a teletype letter signal including:

a unijunction transistor having two terminals adapted to be connected across a direct current source and an emitter, a resistance connected between the emitter and one said terminals, a two-junction transistor having a base, a collector and an emitter, said collector and emitter adapted to be connected across a direct current source, a condenser connected between the emitter of said unijunction transistor and the base of said two-junction transistor, a variable resistance connected across said condenser through said one terminal and said emitter of said unijunction transistor, a rectifier connected between the base and the emitter of said two-junction transistor, and means for producing an alarm actuating signal, and control means connected to said connecting means, to said receive hub terminal and to said alarm signal producing means to cause said connecting means to disconnect a send hub from a receive hub to connect it to said emitter of said two-junction transistor of said signal generating means and to issue the alarm actuating signal when the control means detects spacing on the receive hub terminal for a preselected period of time.

3. A teletype control circuit for insertion between a receive hub, and a send hub comprising:

switch contacts for disconnnecting a send hub from a receive hub, a pair of terminals of which one is adapted to be connected to a send hub and the other is adapted to be connected to a receive hub, said switch contacts being connected in series between said terminals, means for detecting voltage on said receive hub terminal and connected to operate said switch contacts including, a resistance, a rectifier connected in parallel with said resistance, a first transistor having a base connected through said parallel-connected resistance and rectifier to said receive hub terminal, an emitter, and a collector adapted to be connected to a direct current source.

a series resistance network, a relay coil controlling said switch contacts, a second transistor having a base connected to the emitter of said first transistor, an emitter adapted to be connected through the series resistance network to a direct current source, and a collector adapted to be connected to a direct current source through said relay coil, a condenser connected between the base of said first transistor and said series resistive network, and a zener diode connected between the base of said first transistor and said series resistive network.

References Cited

UNITED STATES PATENTS

| | | | |
|---|---|---|---|
| 2,069,251 | 2/1937 | Kinkead | 178—69 |
| 2,332,451 | 10/1943 | Marshall | 178—69 |
| 2,350,180 | 5/1944 | Miller | 178—69 |
| 3,288,929 | 11/1966 | Hutchinson | 178—69 |

NEIL C. READ, *Primary Examiner.*

THOMAS A. ROBINSON, *Examiner.*

UNITED STATES PATENT OFFICE
CERTIFICATE OF CORRECTION

Patent No. 3,331,921 July 18, 1967

James T. Neiswinter et al.

It is hereby certified that error appears in the above numbered patent requiring correction and that the said Letters Patent should read as corrected below.

Column 1, line 13, column 7, lines 57 and 65, and column 8, lines 16, 25 and 53, for "teletype", each occurrence, read -- telegraph --.

Signed and sealed this 2nd day of July 1968.

(SEAL)
Attest:

Edward M. Fletcher, Jr.
Attesting Officer

EDWARD J. BRENNER
Commissioner of Patents